United States Patent [19]

Komatsu

[11] Patent Number: 4,895,037
[45] Date of Patent: Jan. 23, 1990

[54] RACK AND PINION STEERING APPARATUS

[75] Inventor: Shinichi Komatsu, Hatano, Japan

[73] Assignee: Atsugi Motor Parts Company Limited, Kanagawa, Japan

[21] Appl. No.: 344,435

[22] Filed: Apr. 26, 1989

Related U.S. Application Data

[63] Continuation of Ser. No. 777,619, Sep. 19, 1985, abandoned.

[51] Int. Cl.[4] ............................................. B62D 3/12
[52] U.S. Cl. ...................................... 74/422; 74/498; 92/191
[58] Field of Search ........................ 92/189, 190, 191; 403/41, 42, 257, 258, 260; 74/422, 498; 411/436, 367

[56] References Cited

U.S. PATENT DOCUMENTS

| 646,770 | 4/1900 | Thornton et al. | 92/191 |
| 2,847,868 | 8/1958 | Newman | 74/388 PS |
| 3,593,593 | 7/1971 | Bradshaw | 74/498 |
| 3,680,443 | 8/1972 | Jenvey | 74/498 X |
| 3,908,479 | 9/1975 | MacDuff | 74/498 |
| 4,189,955 | 2/1980 | Bishop | 74/498 |
| 4,653,339 | 3/1987 | Komatsu | 74/422 |
| 4,706,513 | 11/1987 | Komatsu | 74/422 |

FOREIGN PATENT DOCUMENTS 2442253  3/1976  Fed. Rep. of Germany.
2931184  2/1981  Fed. Rep. of Germany.

Primary Examiner—Randolph A. Reese
Assistant Examiner—Anthony Knight
Attorney, Agent, or Firm—Bachman & LaPointe

[57] ABSTRACT

In a rack and pinion power steering apparatus including a hydraulic cylinder housing, a pinion, a rack, a piston, a bolt for mounting the piston to the rack, etc., the piston is elastically supported by the bolt to a boss portion of the rack concentrically with respect to the rack at a position offset from the longitudinal axis of the rack in the opposite direction of the rack teeth. Therefore, it is possible to form a threaded hole, into which the piston mounting bolt is screwed, in the boss portion extending under the bottom surface of the rack teeth, thus reducing the longitudinal direction of the rack or cylinder housing to realize a small-sized power steering apparatus.

11 Claims, 7 Drawing Sheets

RACK AND PINION STEERING APPARATUS

This is a continuation of Ser. No. 777,619, filed 9/19/85, now abandoned.

BACKGROUND OF THE INVENTION

1. Field of the Invention

The present invention relates generally to a rack and pinion power steering apparatus for automotive vehicles, and more particularly to a structure for loosely fitting a hydraulic annular piston to the end surface of a rack.

2. Description of the Prior Art

As is well known, power steering apparatuses have widely been incorporated in automotive vehicles for facilitating of vehicle steering. Usually, the power steering apparatus includes a control valve, a power cylinder and an oil pump including discharge and pressure control valves. A rack and pinion power steering apparatus is of one type of power steering apparatuses. In this rack and pinion type, a hydraulic piston connect to a rack for actuating a vehicle steering device is reciprocably moved within a hydraulic cylinder by the pressure of hydraulic fluid. By the way, within the above hydraulic cylinder, since the piston must partition the inside space of the cylinder into two hydraulic fluid chambers, it is very important to stably maintain fluidtightness between the outer peripheral surface of the hydraulic piston and the inner peripheral surface of the hydraulic cylinder. For the above-mentioned purpose, there has been proposed a rack and pinion power steering apparatus such that the piston is elastically attached to the end of the rack in order to eliminate a harmful influence upon the fluidtightness due to misalignment between the piston and the rack within the cylinder. In this type of apparatus, however, since the annular piston is fixed to a boss portion formed at the end of the rack by caulking, the caulking work inevitably requires a skill in the assembly process of the piston and the rack.

To eliminate the above-mentioned skill, the same applicant has proposed a rack and pinion power steering apparatus such that the piston is elastically attached to the end of the rack by use of a bolt. In this apparatus, however, there still exists a problem in that since it is necessary to increase the axial length between the bottom end of the threaded bolt hole and the extreme end of the rack teeth in order to increase the mechanical strength of the rack, the axial length of the rack, that is, of the cylinder inevitably increases, thus resulting in a difficulty in realizing the power steering apparatus of short or small dimensions.

SUMMARY OF THE INVENTION

With these problems in mind, therefore, it is the primary object of the present invention to provide a rack and pinion power steering apparatus of shorter cylinder length in which the annular hydraulic piston is elastically attached to the end of the rack by a piston mounting bolt.

To achieve the above mentioned object, the rack and pinion power steering apparatus according to the present invention comprises: (a) an apparatus housing; (b) a pinion housed within said apparatus housing; (c) a rack housed within said apparatus housing so as to gear with said pinion, said rack being formed at one end thereof with a boss portion having a threaded portion, a longitudinal axis of the boss portion being offset from that of said rack in the opposite direction of rack teeth; (d) an inner elastic sealing member; (e) an outer elastic sealing member; (f) a piston elastically fitted to the boss portion of said rack through said inner elastic sealing member and into said apparatus housing through said outer elastic sealing member for partitioning an inside space of said apparatus housing into two hydraulic fluid chambers; and (g) a piston mounting bolt for loosely supporting said piston to the boss portion of said rack with an axial piston clearance within an annular space formed between said rack and said mounting bolt.

BRIEF DESCRIPTION OF THE DRAWINGS pinion power steering apparatus according to the present invention over the prior art apparatus will be more clearly appreciated from the following description of the preferred embodiment of the invention taken in conjunction with the accompanying drawings in which like reference numerals designate the same or similar elements or sections throughout the figures thereof and in which.

Figure 9:
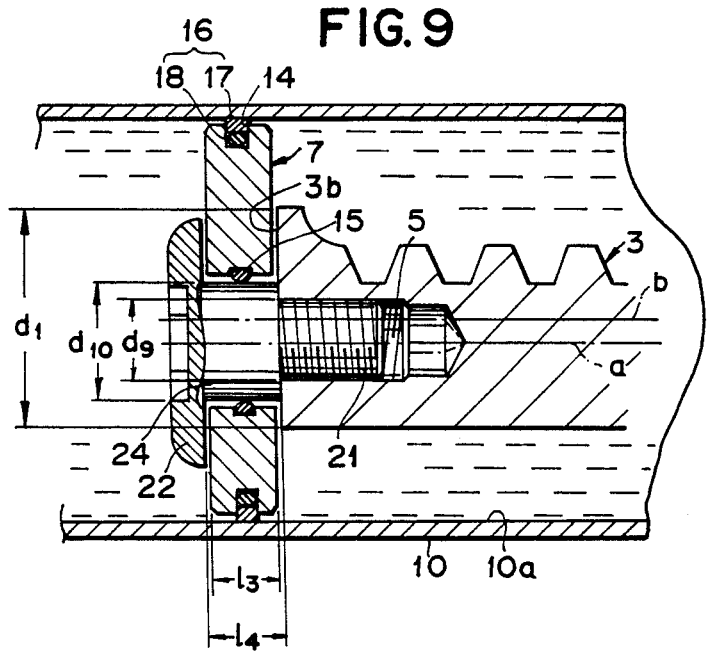
FIG. 9 is an enlarged longitudinal cross-sectional view of a fourth modification of the rack and pinion power steering apparatus according to the present invention, in which the bolt is formed with a large-diameter shoulder portion to which the piston is fitted to increase the mechanical strength an precision at the end of the rack.
Figure 12:
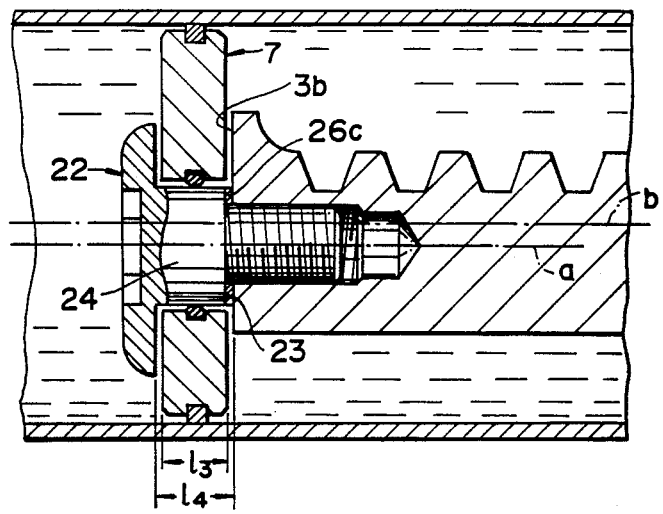
Figure 13:
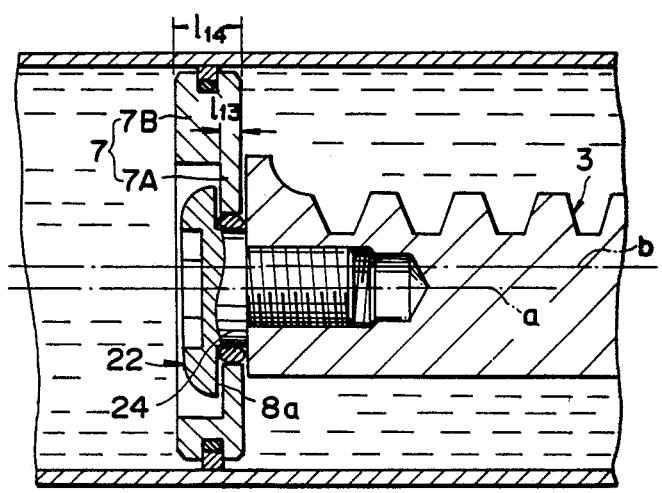

FIG. 12 is the similar view of the fourth modification shown in FIG. 9, in which a shim is disposed under the flat surface of the large-diameter shoulder portion of the bolt to adjust the axial piston clearance relative to the rack and the shoulder bolt; and FIG. 13 is an enlarged longitudinal cross-sectional view of a fifth modification of the rack and pinion power steering apparatus according to the present invention, in which the third modification (a circular recess in the piston) and the fourth modification (a large-diameter shoulder portion of the bolt) are combined.

DETAILED DESCRIPTION OF THE PREFERRED EMBODIMENTS

To facilitate understanding to the present invention, a reference will be made to a prior-art rack and pinion power steering apparatus with reference to the attached drawings.

Figure 1:
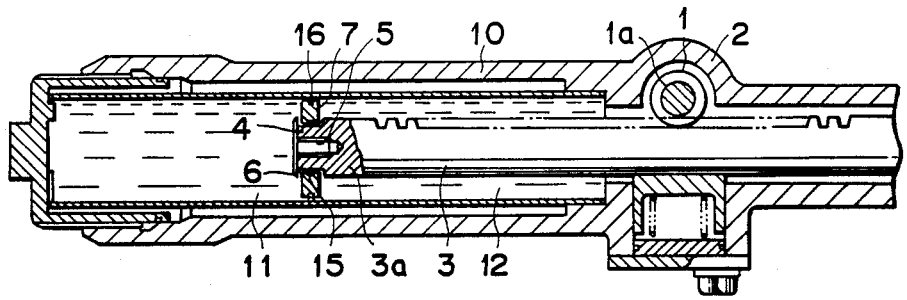
FIG. 1 is a diagrammatical longitudinal cross-sectional view, partly in side view, showing only the essential portion of a prior-art rack and pinion power steering apparatus related to the present invention.

In FIG. 1, the apparatus comprises a pinion shaft 1 rotatably disposed in position within a gear housing 2, a rack 3 driven by a pinion 1a fixed to the pinion shaft 1. The rack 3 is formed with a boss portion 4 at one end 3a of the rack 3. At this boss portion 4, there is formed a threaded hole 5 into which a piston mounting bolt 6 is screwed. The axis of the threaded hole 5 is aligned with the axis of the rack 3. An annular piston 7 is loosely fitted to the boss portion 4 of the rack 3 within a hydraulic cylinder 10 so as to partition the cylinder inside space into two fluid chambers 11 and 12 filled with hydraulic fluid. Further, the reference numeral 15 denotes an inner annual elastic sealing member; the reference numeral 16 denotes an outer annual elastic sealing member, both for sealing the fluid between piston and rack or between piston and cylinder.

Figure 2:
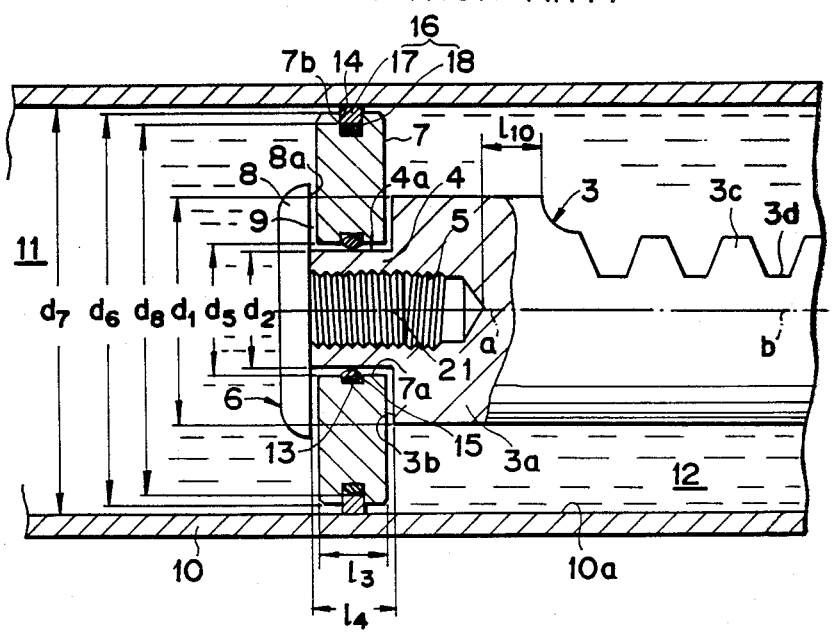
FIG. 2 is an enlarged diagrammatical longitudinal cross-sectional view, partly in side view, showing only a piston mounting bolt, an annular piston and an end of a rack housed within a hydraulic cylinder of the prior-art rack and pinion power steering apparatus shown in FIG. 1.

With reference to FIG. 2, the outer diameter $d_2$ of the rack boss portion 4 is smaller than that $d_1$ of the rack 3. The inner diameter $d_5$ of the annular piston 7 is larger than the outer diameter $d_2$ of the rack boss portion 4. Further, the longitudinal length $\lambda_3$ the piston 7 is smaller than that $\lambda_4$ of the rack boss portion 4. Therefore, the annular piston 7 is loosely supported within an annular space formed between the lower surface 8a of the head 8 of the mounting bolt 6 and the end surface 3b of the boss portion 4 of the rack 3 with piston clearances both in the axial and radial directions of the rack 3.

The inner annual elastic sealing member (rubber seal ring) 15 is disposed within an inner annular groove 13 formed at the inner peripheral surface 7a of the piston 7; the outer annular elastic sealing member 16 is disposed within an outer annular groove 14 formed at the outer peripheral surface 7b of the piston 7. Further, the outer annular elastic sealing member 16 includes an outermost resin seal ring 17 made of a material (e.g. Trade Mark Teflon) having a small friction coefficient but a large wear resistance and an outer elastic rubber seal ring 18 made of a material having a good elasticity for enhancing sealing effect between the outermost resin seal ring 17 and the inner cylindrical surface 10a of the cylinder 10. The outer diameter $d_7$ of the outermost resin seal ring 17 is a little larger than that $d_6$ of the piston 7; the inner diameter $d_8$ of the outermost resin seal ring 17 is smaller than that $d_6$ of the piston 7. Therefore, the outer annular elastic sealing member 16 is fitted to the cylinder 10 in elastic pressure contact with the inner peripheral surface 10a of the cylinder 10 to seal fluid between piston 7 and cylinder 10. Further, the inner diameter of the outer elastic rubber seal ring 18 is smaller than the diameter of the outer annular groove 14 of the piston 7. The inner diameter of the inner elastic seal ring 15 is smaller than the diameter $d_2$ of the rack boss portion 4. Therefore, the inner annular elastic sealing member 15 is fitted to the rack boss portion 3a in elastic pressure contact with the outer peripheral surface 4a of the rack boss portion 4 to seal fluid between the piston 7 and the rack 3.

In the above-mentioned rack and pinion power steering apparatus, the assembly procedure is simple as follows: first the inner and outer annular elastic sealing members 15 and 16 are fitted to the inner and outer annular grooves 13 and 14 of the piston 7, respectively; secondly the piston 7 is fitted to the boss portion 4 of the rack 3; thirdly the bolt 6 is screwed into the threaded hole 5 of the rack boss portion 4. Since the annular piston 7 is elastically fitted to the rack 3 by use of two annular elastic sealing members 15 and 16, it is possible to fluidtightly partition the cylinder inside space into two hydraulic fluid chambers 11 and 12 by the piston 7, while preventing a part of the outer peripheral surface 7b of the piston 7 from being brought into point contact with the inner peripheral surface 10a of the cylinder. The above point contact of the piston 7 may be caused when the piston 7, the rack 3 and the cylinder 10 are not accurately aligned on the same axis or when the rack 3 is not accurately straight.

In the prior-art rack and pinion power steering apparatus, however, there exist shortcomings such that it is impossible to reduce the axial length of the rack 3, that is, of the cylinder 10. This is because it is necessary to sufficiently increase the axial length $\lambda_{10}$ between the bottom end of the threaded hole 5 and the extreme end of rack teeth 3c in order to increase the mechanical strength of the rack 3, under the condition that the axis a of the threaded hole 5 matches the axis b of the rack 3 and therefore the major diameter of the threaded hole 5 is roughly the same as the diameter of the bottom surface 3d of the rack teeth 3c.

In view of the above description, reference is now made to an embodiment of the rack and pinion power steering apparatus according to the present invention, with reference to the attached drawings.

Figure 3:
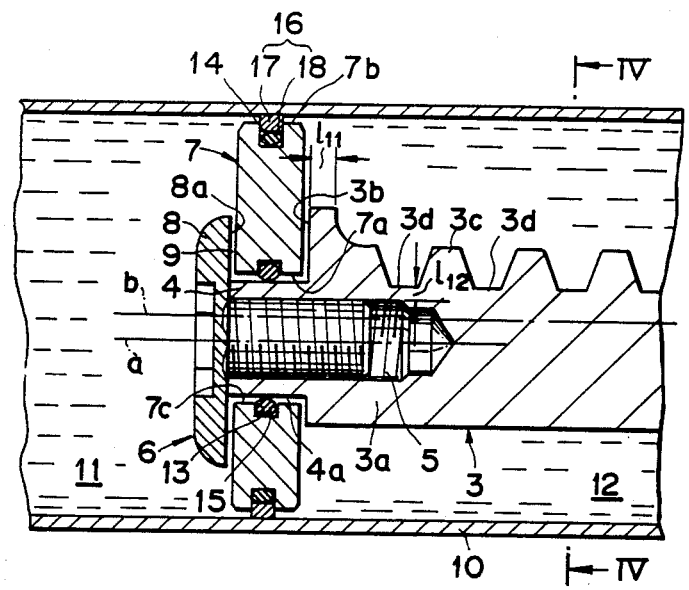
FIG. 3 is an enlarged diagrammatical longitudinal cross-sectional view showing only a piston mounting bolt, an annular piston and an end of a rack housed within a hydraulic cylinder of the preferred embodiment of the rack and pinion power steering apparatus according to the present invention.
Figure 4:
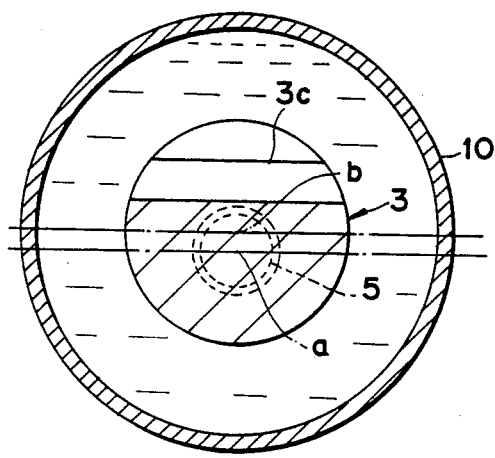
FIG. 4 is an enlarged cross-sectional view of the rack and pinion power steering apparatus according to the present invention, taken along the line IV—IV shown in FIG. 3.
Figure 5:
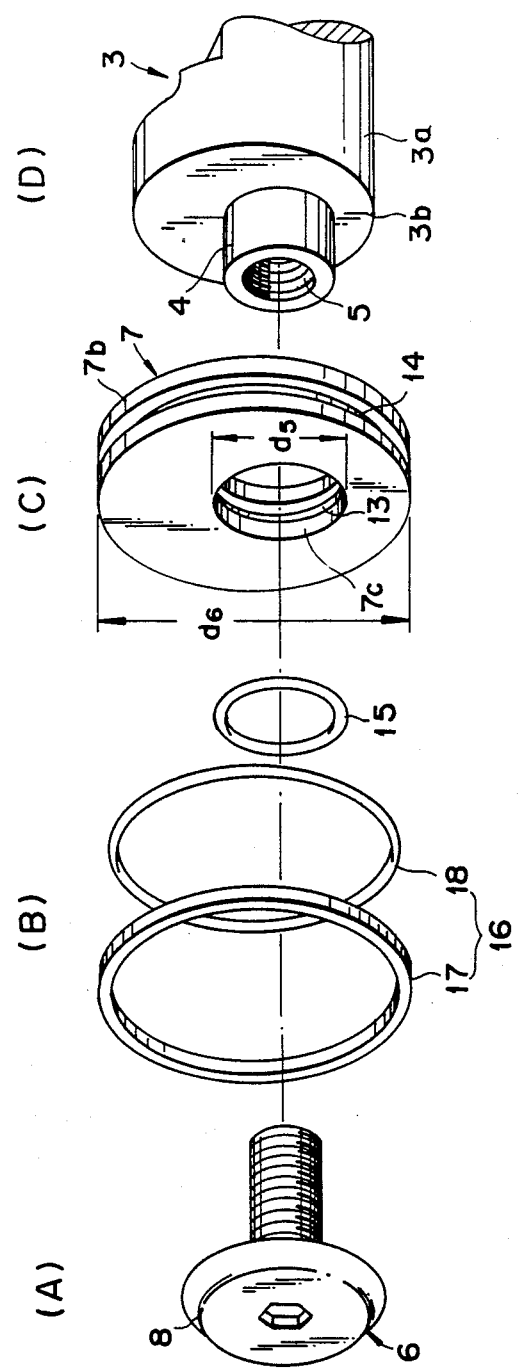
FIG. 5 is an enlarged exploded view showing only the annular piston, the end of the rack, an outermost resin seal ring, inner and outer elastic rubber seal rings and a piston mounting bolt of the rack and pinion power steering apparatus shown in FIG. 3.

FIGS. 3, 4 and 5 shows an embodiment of the present invention. The embodiment is the same in structure as the prior-art power steering apparatus shown in FIGS. 1 and 2 except the offset axis relationship between the boss portion 4 and the rack 3. The same references have been retained for similar parts which have the same functions.

In the embodiment shown in FIGS. 3, 4 and 5, the hydraulic piston 7 is elastically supported by the piston mounting bolt 6 to the rack boss portion 4 concentrically with respect to the rack but at a position offset from the longitudinal axis of the rack 3 in the opposite direction of the rack teeth 3c. That is, the axis a of the threaded hole 5 of the rack boss portion 4 is located away from the axis b of the rack in the direction opposite to the rack teeth 3c. Therefore, it is possible to maintain a distance $\lambda_{12}$ between the bottom surface 3d of the leftmost tooth 3c and the major diameter of the threaded hole 5 formed in the rack boss portion 4, even if the axial distance $\lambda_{11}$ between the extreme end surface 3b of the rack and the cutout portion of the rack 3 is reduced markedly.

In other words, in the embodiment, since the boss portion 4 is offset from the rack 3, it is possible to reduce the longitudinal length of the rack 3 and therefore that of the cylinder 10, without reducing the mechanical strength at the end of the rack to which the piston 7 is elastically fitted, as compared with the prior-art apparatus. The above feature allows the rack pinion steering apparatus to be designed small in size and light in weight.

The structural features and functional effects of the embodiment other than those described above are substantially the same as is the case with the prior-art steering apparatus previously described with reference to FIGS. 1 and 2 and any detailed description of them is believed to be unnecessary.

Figure 6:
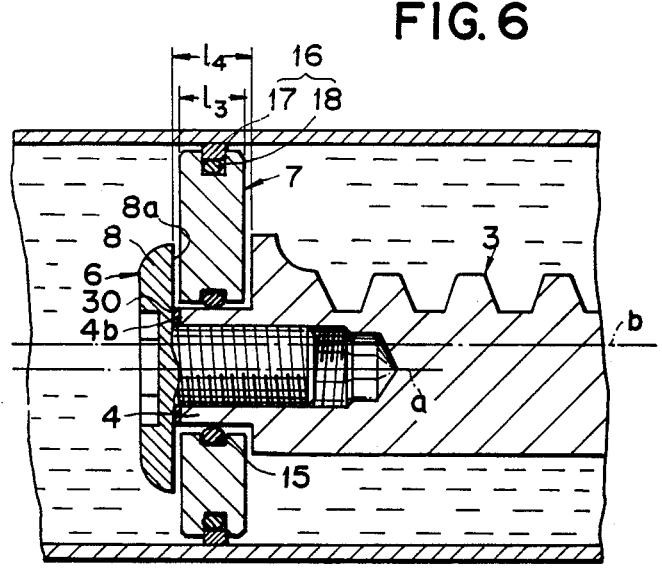
FIG. 6 is an enlarged longitudinal cross-sectional view of a first modification of the rack and pinion power steering apparatus according to the present invention, in which an annular shim is disposed between the lower surface of the bolt head and the extreme end surface of the rack to adjust the axial piston clearance relative to the rack and bolt.

FIG. 6 shows a first modification of the embodiment of the present invention shown in FIGS. 3, 4 and 5. In this modification, the axial piston clearance ($\lambda_4$-$\lambda_3$) within the annular space formed between the rack boss portion 4 and the mounting bolt 6 is adjusted by use of an appropriate shim 30 selected from a number of shims with different thicknesses.

As already described, since the piston 7 is elastically fitted to the rack boss portion 4 through the inner and outer elastic sealing members 15 and 16, the axial clearance ($\lambda_4$-80 $_3$) should be determined precisely. Therefore, even if the axial thickness $\lambda_3$ of the piston 7 and the axial length $\lambda_4$ of the rack boss portion 4 are not machined precisely, it is possible to adjust the mutual axial relationship between the two by changing the thickness of the shim 30. The shim 30 is positioned between the lower surface 8a of the head 8 of the mounting bolt 6 and the extreme end surface 4b of the boss portion 4 of the rack 3.

Figure 7:
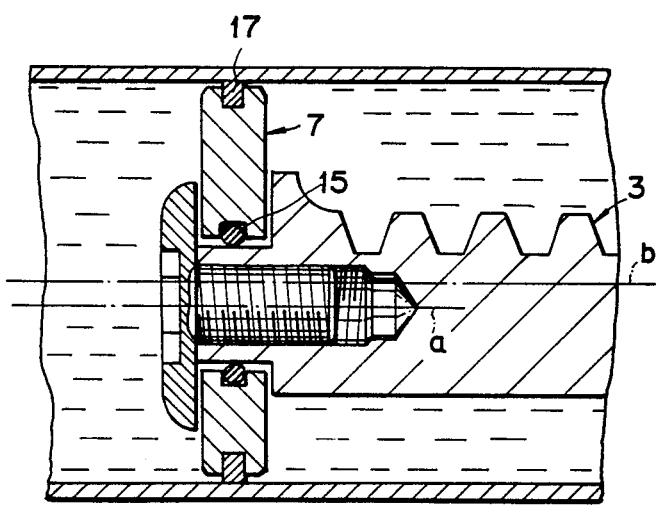
FIG. 7 is an enlarged longitudinal cross-sectional view of a second modification of the rack and pinion power steering apparatus according to the present invention, in which the outer elastic rubber seal ring is eliminated.

FIG. 7 shows a second modification of the embodiment of the present invention. In this modification, the outer elastic rubber seal ring 18 (shown in FIG. 3) is omitted. This is because it is possible to elastically support the piston 7 by the rack 3 with only the inner elastic sealing member (rubber seal ring) 15 thus economizing the number of parts or the manufacturing cost.

Figure 8:
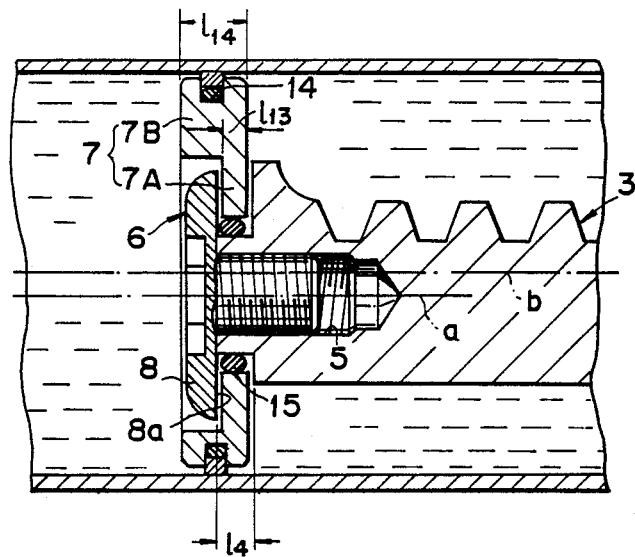
FIG. 8 is an enlarged longitudinal cross-sectional view of a third modification of the rack and pinion power steering apparatus according to the present, in which a circular recess is formed in the piston to further reduce the axial length of the rack.

FIG. 8 shows a third modification of the embodiment of the present invention. In this modification, the piston 7 is formed with a circular recess to which the head 8 of the bolt 6 is sunk. That is, the piston 7 includes an inner annular portion 7A with a thickness $\lambda_{13}$ and an outer annular portion 7B with a thickness $\lambda_{14}$. The inner annular portion 7A is elastically supported within an annular space formed between the lower surface 8a of the bolt head 8 and the extreme end of the rack 3. In this modification, since the bolt head 8 is placed within the annular space formed within the thick outer annular portion 7B and on the thin inner annular portion 7A, it is possible to further reduce the axial length of the rack 3 or the cylinder 10. Additionally, when the thickness $\lambda_{14}$ of the piston 7 is sufficient, it is also possible to form the outer annular groove 14 into which the outer elastic sealing member 16 is fitted.

FIG. 9 shows a fourth modification of the embodiment of the present invention. In this modification, the piston mounting bolt is a shoulder bolt 22 having a large-diameter shoulder portion 24. The diameter $d_{10}$ of the shoulder portion 24 is larger than that $d_9$ of the threaded portion 21 but smaller that $d_1$ of the rack 3. The axial length $\lambda_4$ of the shoulder portion 24 is greater than the axial thickness $\lambda_3$ of the piston 7. The inner elastic sealing member 15 is disposed between the outer peripheral surface of the bolt shoulder portion 24 and the inner peripheral surface of the piston 7. The piston 7 is elastically supported with an appropriate axial piston clearance within an annular space formed by the outer surface of the shoulder portion 24, the lower surface of the head of the shoulder bolt 22 and the extreme end 3b of the rack 3. In the shoulder bolt 22, since the bolt has a stepped or shoulder portion 24, it is unnecessary to form the boss portion 4 of the rack 3. Additionally, it is possible to machine a precise shoulder bolt 22 relatively easily while increasing the mechanical strength.

Figure 10:
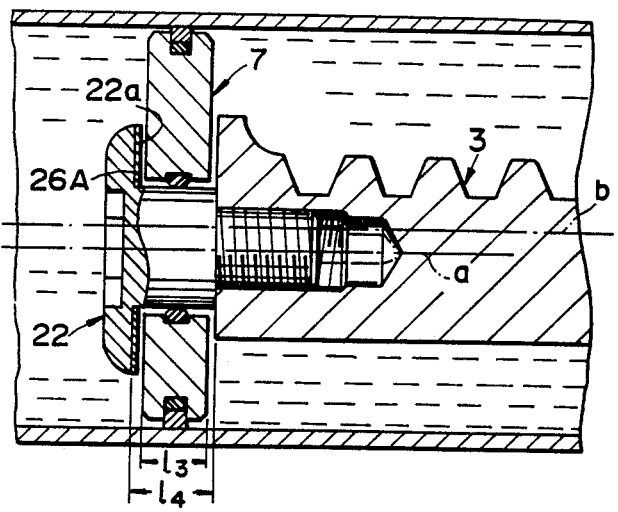
FIG. 10 is the similar view of the fourth modification shown in FIG. 9, in which a shim is disposed under the lower surface of the bolt head to adjust the axial piston clearance relative to the rack and the shoulder bolt.
Figure 11:
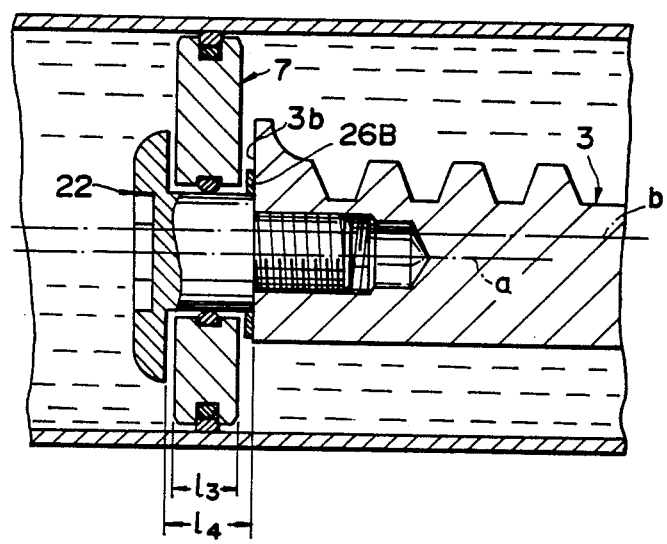
FIG. 11 is the similar view of the fourth modification shown in FIG. 9, in which a shim is disposed at the extreme end of the rack to adjust the axial piston clearance relative to the shoulder bolt.

FIGS. 10, 11 and 12 show the fourth same modification of the embodiment of the present invention, in which the axial piston clearance is adjusted by a shim of different thicknesses. In FIG. 10, a shim 26A is disposed under the lower surface 22a of the head of the shoulder bolt 22. In FIG. 11, a shim 26B is disposed on the extreme end surface 3b of the rack 3. In FIG. 12, a shim 26C is disposed between the lower surface 23 of the shoulder portion 24 of the shoulder bolt 22 and the extreme end 3B of the rack 3. In any case, it is possible to adjust the piston clearance ($\lambda_4$-$\lambda_3$), even if the piston 7 or the shoulder bolt 22 is not machined strictly precisely.

FIG. 13 shows a fifth modification of the embodiment of the present invention. This modification can be obtained in combination of the third modification shown in FIG. 8 and the fourth modification shown in FIG. 9. In more detail, the piston 7 includes an inner annular portion 7A with a thickness $\lambda_{13}$ and an outer annular portion 7B with a thickness $\lambda_{14}$. Additionally, the piston mounting bolt is a shoulder bolt 22 having a large-diameter stepped or shoulder portion 24. In this modification, it is possible to reduce the axial length of the rack 3 or the cylinder 10 and to machine a precise shoulder bolt 22 easily while increasing the mechanical strength.

As described above, in the rack and pinion power steering apparatus according to the present invention, since the hydraulic piston is elastically supported by the piston mounting bolt to the boss portion of the rack concentrically with respect to the rack at a position offset from the longitudinal axis of the rack in the opposite direction of the rack teeth, it is possible to form a threaded bolt hole extending under the rack teeth. Therefore, it is possible to reduce the length of the rack or the cylinder, that is, the power steering apparatus, without reducing the mechanical strength of the rack.

What is claimed is:

1. A rack and pinion steering apparatus which comprises:
    (a) an apparatus housing including a cylinder for housing hydraulic fluid, said cylinder having a central longitudinal axis;
    (b) A pinion housed within said apparatus housing;
    (c) a rack housed within said apparatus housing so as to gear with said pinion, said rack having a central axis coincident with said central longitudinal axis of said housing and being formed at one end thereof with a boss portion having a threaded portion, a longitudinal axis of the boss portion being offset from said rack central axis in the opposite direction of rack teeth;

(d) an inner elastic sealing member;

(e) an outer elastic sealing member;

(f) a piston elastically fitted to the boss portion of said rack through said inner elastic sealing member and into said apparatus housing through said outer elastic sealing member for partitioning said cylinder into two hydraulic fluid chambers, said piston having an eccentric hole into which the loss portion of said rack and the inner elastic sealing member are inserted, said hole having a center axis which is aligned with the longitudinal axis of the boss portion; and (g) a piston mounting bolt for loosely supporting said piston to said rack with an axial piston clearance within an annular space formed between said rack and said mounting bolt.

2. The rack and pinion power steering apparatus as set forth in claim 1, which further comprises a shim disposed between one end surface of a head of said mounting bolt and an extreme end of the boss portion of said rack to adjust an axial piston clearance within the annular space formed between said rack and said mounting bolt.

3. The rack and pinion power steering apparatus as set forth in claim 1, wherein said inner elastic sealing member is an inner elastic rubber seal ring, and said outer elastic sealing member comprises an outer elastic rubber seal ring and an outermost resin seal ring having a diameter larger than that of said outer elastic rubber seal ring.

4. The rack and pinion power steering apparatus as set forth in claim 1, wherein said inner elastic seating member is an inner elastic rubber seal ring, and said outer elastic sealing member is an outermost resin seal ring.

5. The rack and pinion power steering apparatus as set forth in claim 1, wherein said piston comprises a thin inner annular portion elastically supported within the annular space formed between said rack and said mounting bolt with an appropriate axial piston clearance and a thick outer annular portion 7B, a head of said piston mounting bolt being sunk within an annular space formed within said thick outer annular portion and on said thin inner annular portion.

6. The rack and pinion power steering apparatus as set forth in claim 1, wherein said piston mounting bolt is a shoulder bolt having a shoulder portion for elastically supporting said piston, the annular space for supporting said piston with an axial piston clearance being formed by a surface of a head of said shoulder bolt, the shoulder portion of said shoulder bolt, and the extreme end of said rack.

7. The rack and pinion power steering apparatus as set forth in claim 6, which further comprises a shim for adjusting an axial piston clearance within the annular space formed between said rack and said shoulder bolt.

8. The rack and pinion power steering apparatus as set forth in claim 7, wherein said shim is disposed under a head of said shoulder bolt.

9. The rack and pinion power steering apparatus as set forth in claim 7, wherein said shim is disposed on the extreme end surface of said rack.

10. The rack and pinion power steering apparatus as set forth in claim 7, wherein said shim is disposed between the shoulder portion of said shoulder bolt and the extreme end of said rack.

11. The rack and pinion power steering apparatus as set forth in claim 1, wherein said piston mounting bolt is a shoulder bolt having a shoulder portion and said piston comprises a thin inner annular portion elastically supported within the annular space formed between said rack and said shoulder bolt with an appropriate axial piston clearance and a thick outer annular portion, a head of said shoulder bolt being sunk within an annular space formed within said thick outer annular portion and on said thin inner annular portion of said piston.

* * * * *